United States Patent [19]

Falk

[11] 4,358,630

[45] Nov. 9, 1982

[54] REPLACEMENT CAP FOR REPEATING USE THERMOCOUPLE

[76] Inventor: Richard A. Falk, 519 Westminster Dr., Waukesha, Wis. 53186

[21] Appl. No.: 221,963

[22] Filed: Jan. 2, 1981

[51] Int. Cl.³ .......................... G01K 1/12; G01K 7/00
[52] U.S. Cl. .................................. 136/234; 136/242; 374/139
[58] Field of Search ...................... 73/354, DIG. 9; 136/232, 234, 242, 233

[56] References Cited

U.S. PATENT DOCUMENTS

| 1,615,983 | 2/1927 | Jones | 136/232 X |
| 3,038,951 | 6/1962 | Mead | 136/234 |
| 3,288,654 | 11/1966 | Perrin et al. | 136/234 |
| 3,455,164 | 7/1969 | Boyle | 73/354 |
| 3,656,346 | 4/1972 | Collins | 73/DIG. 9 |
| 3,791,219 | 2/1974 | Falk | 73/864.57 |
| 3,816,183 | 6/1974 | Kraus | 136/234 |
| 4,179,309 | 12/1979 | Hance et al. | 136/232 X |

Primary Examiner—Daniel M. Yasich
Attorney, Agent, or Firm—Henry C. Fuller

[57] ABSTRACT

Disclosed herein is a field replaceable protective cap for a thermocouple assembly for measuring the temperature of a molten metal bath. The cap has projecting pins which pierce and frictionally engage the refractory fiber sleeve which protects the thermocouple assembly.

1 Claim, 3 Drawing Figures

U.S. Patent  Nov. 9, 1982  4,358,630
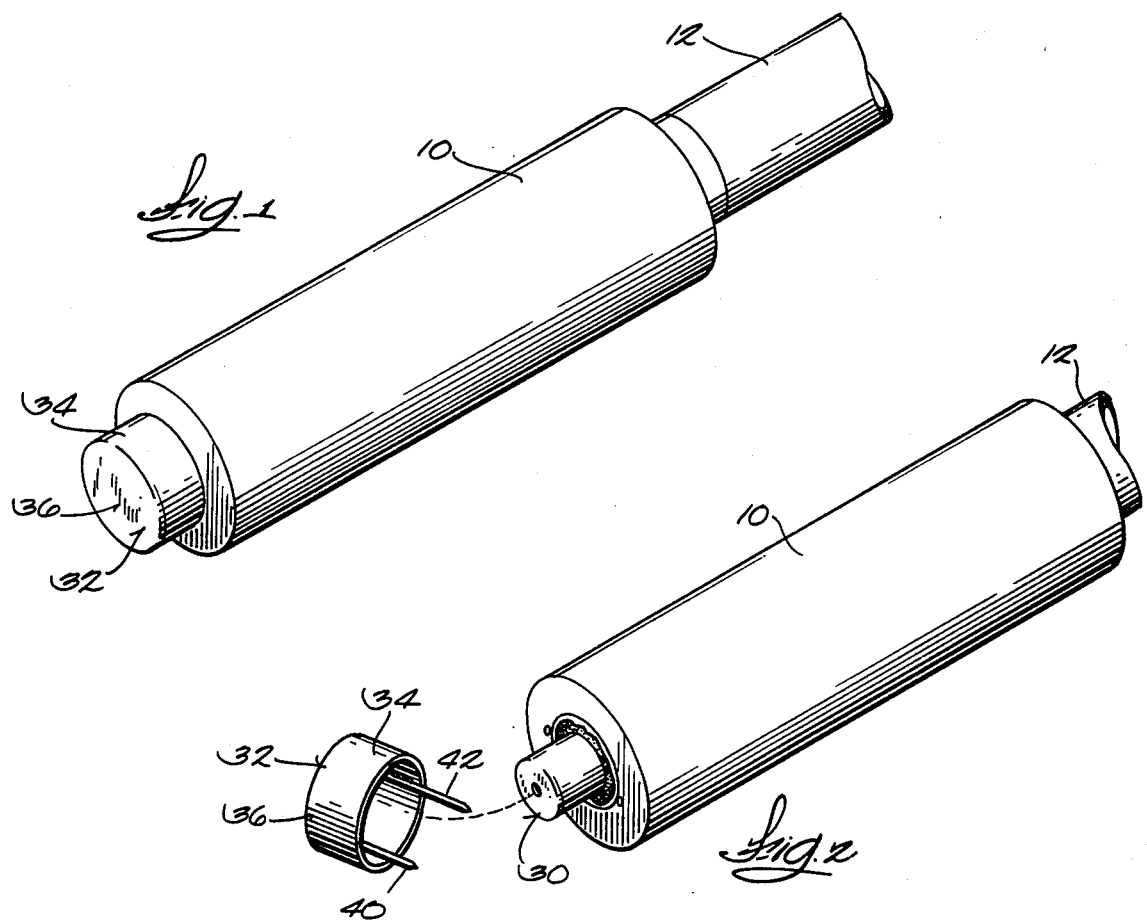
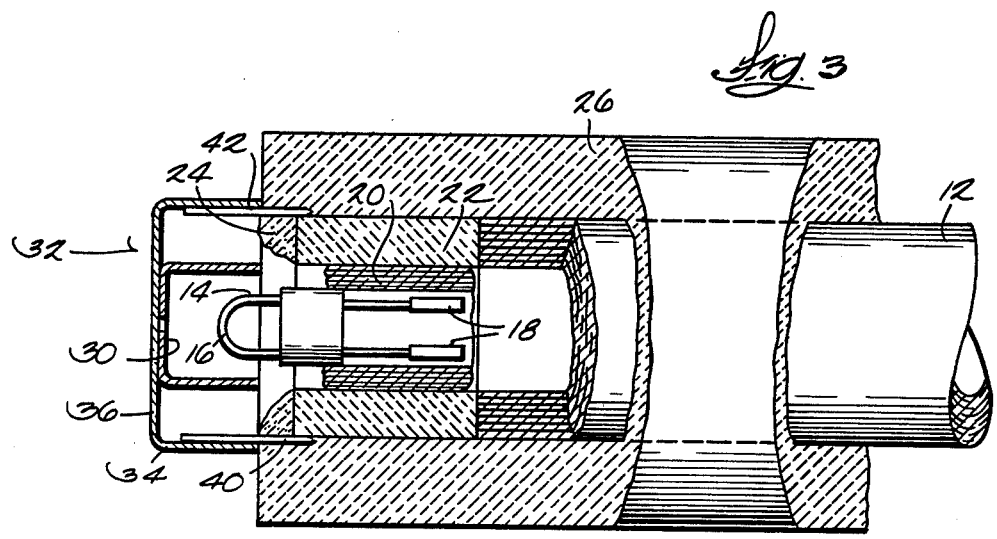

REPLACEMENT CAP FOR REPEATING USE THERMOCOUPLE

BACKGROUND OF THE INVENTION

The invention relates to a field replaceable protective cap for an immersion thermocouple tip adapted for repeated use. The use of protective caps in the molten metal, temperature measuring and sample retrieval field is illustrated in U.S. Pat. Nos. 3,791,219 and 3,455,164. The fused quartz or glass thermocouple tubes are fragile and can break during handling and when passing through slag. The samplers shown in those patents, however, are intended for a single use rather than for repeated measurements. U.S. Pat. No. 3,816,183 is illustrative of a refractory fiber sleeve for a repeating use thermocouple.

SUMMARY OF THE INVENTION

The invention provides a field replaceable protective cap for repetitive thermocouple temperature sensing devices which is easily installed by the users in the steel mill or foundry. The thermocouple assembly is housed in a relatively soft refractory or ceramic fiber protective sleeve. The instant invention provides a cap with projecting pins fixed to the cylindrical walls of the cap and in the same diametral plane. The pins easily pierce the relatively soft protective sleeve and frictionally retain the cap to the device. In use, the cap is consumed and additional caps can be employed for the protection of the thermocouple element during handling and repeated immersions.

Further objects and advantages of the invention will become apparent from the disclosure.

DESCRIPTION OF THE DRAWINGS

FIG. 1 is a perspective view of a sampler embodying the replaceable cap of the invention.

FIG. 2 is a view of the sampler shown in FIG. 1 with the protective cap removed.

FIG. 3 is an enlarged sectional view of the thermocouple assembly and protective cap of the invention shown in FIG. 1.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

FIG. 2 shows the thermocouple temperature measuring assembly 10 which can be provided with a pipe or rod 12 for manipulation thereof. The thermocouple assembly includes a U-shaped quartz or high temperature resistant tube 14 with a tip 16 which projects exteriorly of the assembly for contact with the molten metal. The hot junction of the thermocouple wires is contained in the tip 16. Contacts 18 can be provided for connection with instrument leads. The thermocouple element can be supported in several telescopicly related cardboard tubes 20, 22 which are sealed at the end by refractory cement 24. To enable the thermocouple assembly to be used for repetitive testing, a refractory fiber or ceramic fiber jacket or sleeve 26 is arranged around the thermocouple element. A refractory fiber such as Babcock & Wilcox Kaowool 2600 bulk fiber which is 55% alumina and 44.9% silica can be employed. The assembly can be provided with an optional inner cap 30 which is cemented in place by the refractory cement. Cap 30 is fusible and disintegrates in use.

The invention provides a cap 32 which can be employed to protect the tip 16 during handling of the thermocouple assembly 10 and during immersion through slag. The cap 32 has a cylindrical side wall 34 and an end wall 36. Means are provided for readily attaching the cap 32 to the thermocouple assembly. As disclosed, the means comprises pins 40 and 42 which are arranged in the same diametral plane through the cap and welded or otherwise secured on the inside or outside of the cap. The pins 40 and 42 are spaced so that they will clear the refractory cement and penetrate and frictionally interfit in the refractory fiber sleeve 26. The diameter of the cap is such that the cap 32 is easily assembled in the field in concentric arrangement over the inner cap and around the inner thermocouple assembly. The caps are assembled by manually pushing the cap onto the assembly. Although the disclosed temperature measuring device has a refractory fiber jacket which is easily penetrated by the pins 40, other jackets can be employed which can be penetrated by the pins 40. Any extensions or projections from the cap which will penetrate the protective sleeve and retain the cap in place can be employed.

I claim:

1. In a high temperature thermocouple assembly for repeated measurement of the temperature of a molten metal bath including a temperature measuring device having a projecting sensing element, means for supporting the element, and a penetrable protective sleeve surrounding the means for supporting the element, the improvement comprising a fusible metal cap for protecting the tip during handling and immersion through molten metal slag, said cap being provided with projecting means for penetrating said protective sleeve and frictionally retaining the cap on the sleeve and assembly and wherein said projecting means comprise pins arranged in a diametral plane through the cap and welded to the inside of the cap and projecting exteriorly of the cap.

* * * * *